June 19, 1962    C. C. MACK    3,040,209
PLASMA GENERATOR

Filed Sept. 30, 1960    2 Sheets-Sheet 1

INVENTOR
CHARLES C. MACK

BY *Harmon & Kurz*
ATTORNEY

June 19, 1962 C. C. MACK 3,040,209
PLASMA GENERATOR
Filed Sept. 30, 1960 2 Sheets-Sheet 2
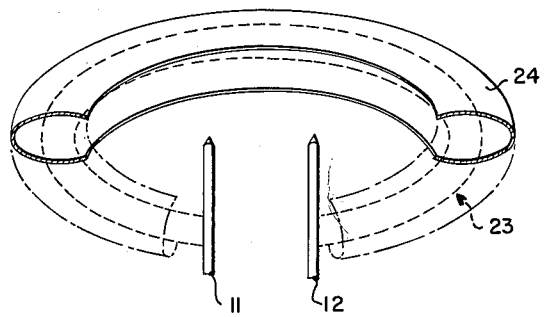
FIG. 3.
FIG. 4.
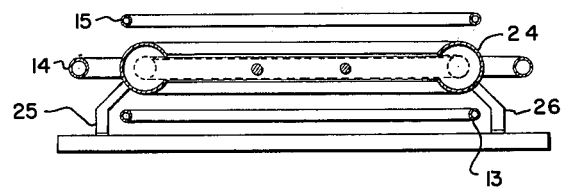
FIG. 5.
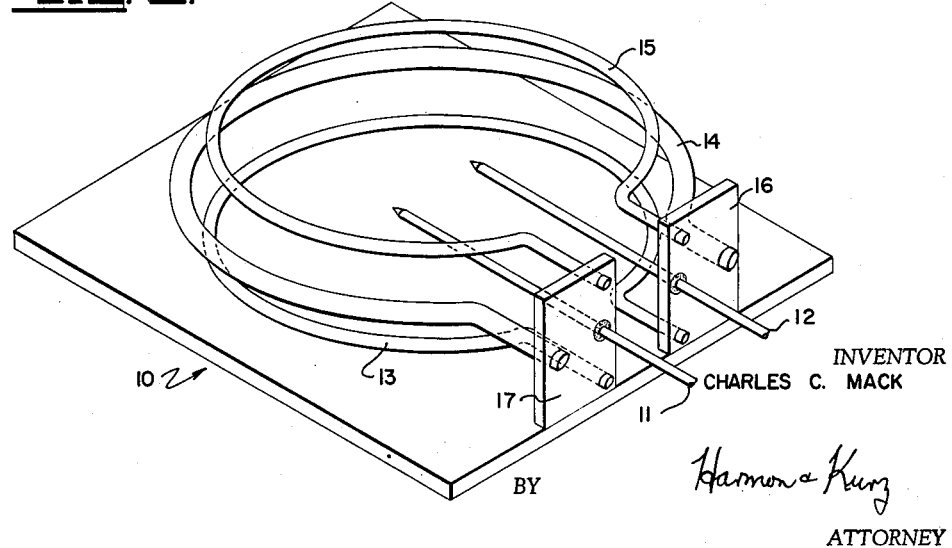
INVENTOR
CHARLES C. MACK
BY Harmon & Kurz
ATTORNEY

3,040,209
PLASMA GENERATOR
Charles C. Mack, 916 Camden St., Alexandria, Va.
Filed Sept. 30, 1960, Ser. No. 59,624
7 Claims. (Cl. 315—111)

This invention relates to electronic plasma generators generally and more particularly to an improved controlled generator and method for creating and maintaining a circular or oval shaped plasma.

Recent advances in the development of thermo nuclear reactions have lead to the release of large amounts of energy through the fusion of atomic nuclei. In atomic weapons, the uncontrolled release of tremendous amounts of energy has been obtained when fusionable material is heated to a high temperature to initiate the fusion of the nuclei of the atoms of fusionable material utilized. These advances in the field of uncontrolled thermo nuclear reactions have given rise to demands for a controlled thermo nuclear reaction from which useful power may be obtained.

Many problems exist relative to the production of a controlled thermo nuclear reaction which do not arise during the process of creating an uncontrolled release of energy. The heating of matter to a very high temperature results in ionization and the atoms of the heated material become stripped of the electrons which normally surround their nuclei. When the heated material reaches the ionization temperature, a group of charged particles called plasma are obtained. This plasma is the result of a mixture of ions consisting of atoms which have lost some or all of their electrons, and a number of remaining free electrons. Once created, this plasma may be heated to varying degrees of temperature, and if heated to a degree sufficient to cause the fusion of the charged particles, large amounts of energy will be released. To obtain a thermo nuclear release of energy, the obstacles concomitant with the effective transfer of heat energy to a space charge of ionized material must be surmounted.

In order to efficiently heat the charged particles or plasma once it has been created, the plasma must be adequately confined. Hot plasma exerts an outward pressure and tends to expand when subjected to greater degrees of heat in direct relationship to the temperature applied. The heated plasma must be prevented from striking confining material walls, as this contact will cause the particles to give up energy or to pick up impurities which in turn absorb energy.

It is therefore obvious that the problems of providing sufficient heat to a material so that a plasma may be generated therefrom and the subsequent heating and confinement of the plasma are of paramount importance to the successful operation of a controlled plasma generator. It has been previously discovered that confinement of a plasma may be obtained through the use of magnetic fields. These magnetic fields may be produced by current passing through the plasma itself or through the use of external coils. In several of the devices known to the prior art, the so-called pinch approach has been used wherein the confining magnetic fields result from current flow through the plasma. Most of these pinch approach devices utilize an induction principle wherein the current through the plasma is furnished from an exterior primary coil to a secondary which consists of the ionized material. This passage of current through the ionized material results in ohmic or resistive heating. Toroidal or linear tubes have been previously utilized to obtain the generation and control of a thin straight arc of plasma under the pinch approach. Although these devices possess great simplicity of construction, the toroidal tubes are limited by the current conduction limitations in the primary induction coils while the linear tubes have large end losses. Also the straight arc of plasma produced by these prior tubes is subject to instabilities which make difficult the prolonged control and maintenance of the arc.

The present invention incorporates the simplicity of construction inherent in prior pinch approach devices to develop a controlled plasma generator which is capable of producing and maintaining a circular or oval shaped plasma which resembles the conventional electric arc. This generator lends itself to a wide variety of applications where a high temperature or a high intensity heat or light source is desired.

The primary object of this invention is to provide a controlled plasma generator for creating a circular or oval shaped plasma.

Another object of this invention is to provide a controlled plasma generator for creating and maintaining a plasma in a circular or oval configuration.

A further object of this invention is to provide a controlled plasma generator capable of producing an oval shaped plasma through the ionization of gas or gases by temperatures produced by the squeeze effect brought about by opposing magnetic fields and the application of ionizing currents to the gases.

Another object of this invention is to provide a controlled plasma generator for producing an oval shaped plasma and maintaining the plasma in a substantially circular or oval configuration by the utilization of opposing magnetic fields.

A further object of this invention is to provide a controlled plasma generator for producing an oval shaped plasma and maintaining the plasma in substantially an oval configuration by mechanical containment of the plasma.

Another object of this invention is to provide a controlled plasma generator for creating an oval shaped plasma and maintaining the plasma in substantially an oval configuration by a combination of mechanical and electrical containment of the plasma.

A further object of this invention is to provide a method for creating a circular or oval plasma by use of the magnetic field created by the plasma while conducting an electric current.

Another object of this invention is to provide a method for creating a circular plasma by mechanically or physically containing said plasma.

A further object of this invention is to provide a method for creating a circular plasma by the utilization of opposing magnetic fields.

A still further object of the invention is to provide a method for creating an oval or circular plasma by mechanically and electrically containing the plasma.

With the foregoing and other objects in view, the invention resides in the following specification and appended claims, certain embodiments and details of construction of which are illustrated in the accompanying drawings in which:

FIGURE 3 is a perspective view of an embodiment of the plasma generator of the present invention illustrating an arc shielding structure.

FIGURE 4 is an elevational view in partial vertical section of an embodiment of the plasma generator of the present invention illustrating the use of an electrical and mechanical arc containing structure; and FIGURE 5 is a perspective view of the plasma generator of the present invention.

Figure 1:
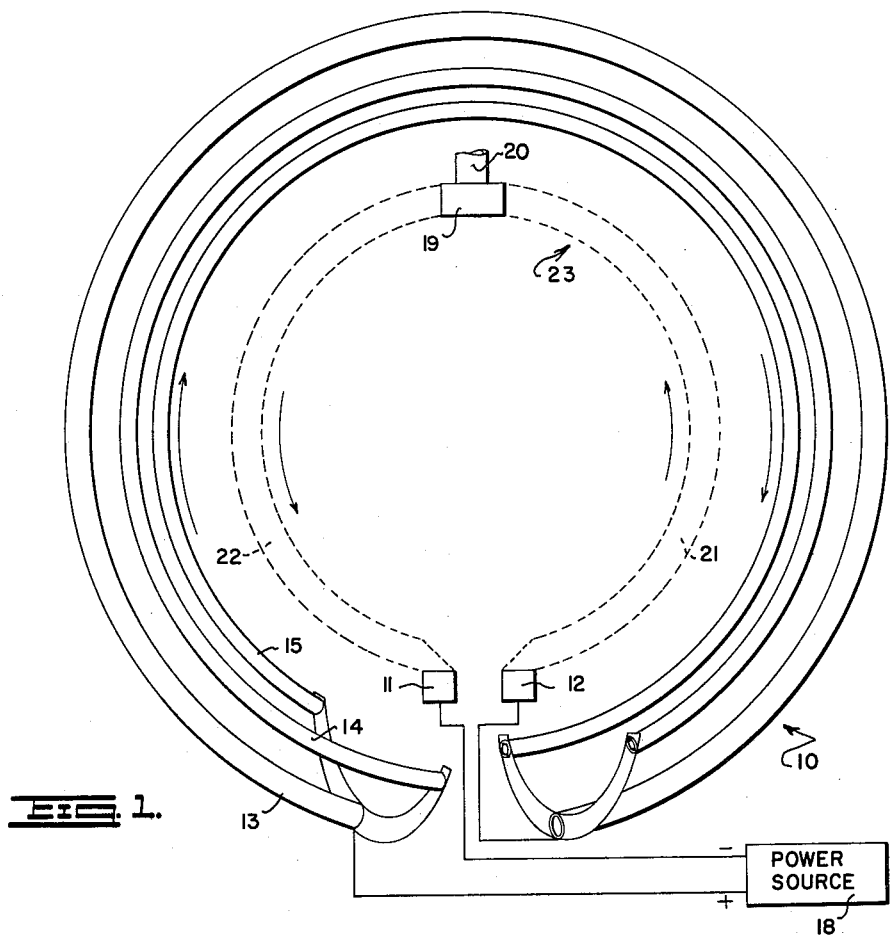
FIGURE 1 is a schematic representation of the plasma generator of the present invention.

Referring to FIGURE 1, the controlled plasma generator of the present invention indicated generally at 10 includes two electrodes 11 and 12 which may be positioned in spaced relationship as illustrated by FIGURE 1 or which may be positioned at any specified angle with relationship to each other. Encircling the electrodes 11 and 12 are a plurality of outer conductors 13, 14 and 15 which are normally constructed of a hollow tubing formed to an oval or circular configuration. Because of the extremely high temperatures involved in the plasma generating process, a suitable liquid coolant is circulated through the tubular conductors 13, 14 and 15 during the operation of the generator 10. The outer conductors 13, 14 and 15 may be supported in fixed relationship to the inner electrodes 11 and 12 by any suitable means above a base as illustrated by the blocks 16 and 17 of FIGURE 5.

Electric current is furnished to the outer conductors 13, 14 and 15 and the inner electrodes 11 and 12 from a suitable power source 18. This current is supplied so that the current flow in the outer conductors 13, 14 and 15 is opposite in direction to the current flow between the inner electrodes 11 and 12. This current flow may be accomplished by the illustrated electrical connections of FIGURE 1 wherein the electrodes 11 and 12 are placed in series with the outer conductors 13, 14 and 15 and the power source 18. This desired current flow might also be obtained by utilizing separate power sources for the outer conductors 13, 14 and 15 and the inner electrodes 11 and 12. The outer electrodes 13, 14 and 15 may be connected in parallel, as illustrated by FIGURE 1, or each outer conductor may be supplied individually from an individual power source. For normal operation, the power source 18 provides direct current to the electrodes 11 and 12 and the outer conductors 13, 14 and 15, but the generator 10 may be used with varying or pulsating currents as well as with alternating currents, once a plasma has been established and the temperatures remain high enough to permit sufficient ionization to remain and support conduction when the voltage from the power source rises after a current reversal or interruption. Suitable control means (not shown) may be introduced in the circuit of FIGURE 1 between the power source 18 and the inner electrodes 11 and 12 and outer conductors 13, 14 and 15 to adjust the currents therein.

Figure 2:
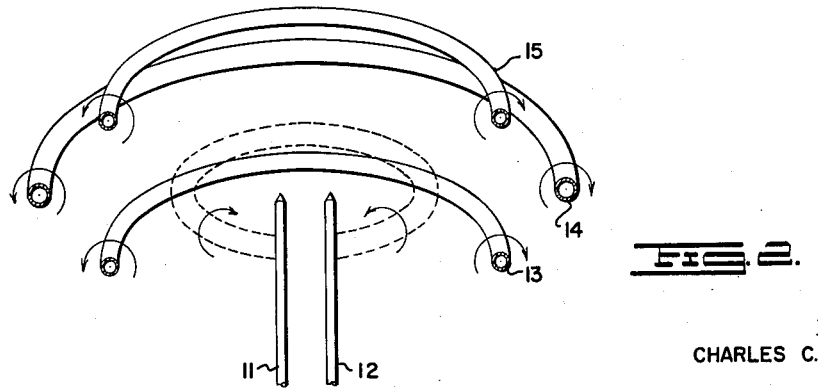
FIGURE 2 is a perspective view in vertical section of the plasma generator of FIGURE 1 showing the relationship of the magnetic fields which are produced by the generator.

In the operation of the plasma generator 10 of FIGURES 1 and 5, the generator may be placed in a suitable container or it may be operated in air without a covering container. If a container is utilized, air or other gases suitable for ionization purposes may be introduced at any point to surround the generator 10, or the generator may be utilized in quiet gases at any specified pressure. If gases are introduced into the generator 10, it is preferable to accomplish this introduction at the center of the circular conductors 13, 14 and 15. In starting the generator 10, a movable striking electrode indicated at 19 in FIGURE 1 is introduced across the inner electrodes 11 and 12. Striking electrode 19 may be mounted upon a shaft 20 so that it may be easily brought into contact with the electrodes 11 and 12 and subsequently withdrawn. As the striking electrode 19 is withdrawn after contact with the electrodes 11 and 12, two arcs or plasmas 21 and 22 are formed between the striking electrode 19 and the electrodes 11 and 12. As indicated by FIGURE 1, the current flow induced within one of the individual arcs or plasmas 21 or 22 by an inner electrode 11 or 12 is opposite in direction to that induced in the remaining plasma or arc. An induced magnetic field is created about each individual plasma which produces forces that tend to force the two conducting gaseous plasmas 21 and 22 apart. Because of these opposing magnetic forces, the arcs of plasma previously created will be forced outwardly in a radial direction to create a circular arc of plasma 23 of continuously increasing diameter. In order to contain the plasma 23 and prevent it from increasing in diameter until it extinguishes itself, electric currents are introduced in the outer encircling conductors 13, 14 and 15. As previously described, the current is caused to flow through the outer conductors 13, 14 and 15 in a direction opposite to that of the current induced in the plasmas 21 and 22 by the inner electrodes 11 and 12. Thus, as illustrated by FIGURE 2, an opposing magnetic field is created about the outer conductors 13, 14 and 15 which interacts with the magnetic field about a electrically conducting plasma 23, and forces are created which tend to displace the plasma 23 inwardly away from the outer conductors. Eventually, a point of equilibrium between these two opposing magnetic forces will be obtained, and the plasma 23 will be contained in an extremely stable state. Any deviation of the plasma 23 from the equilibrium position will give rise to forces which will act upon the plasma and cause a restoration to a position of equilibrium. The size of the arc which will be obtained is determined by the amount of current which is permitted to flow within the plasma 23, and the amount of current which is fed through the outer encircling conductors 13, 14 and 15, as well as the diameter of the outer encircling conductors.

FIGURE 3 illustrates an embodiment of the controlled plasma generator of FIGURE 1 in which the outer conductors 13, 14 and 15 are removed. In the generator of FIGURE 3, the arcs or plasmas 21 and 22 are created by bridging the inner electrodes 11 and 12 with the striking electrode 19. The magnetic forces about the plasmas 21 and 22 tend to force them to conform to a circular or oval configuration, and the plasma is then contained by employing a mechanical shield 24. Shield 24 may be supported by insulating blocks 25 and 26, shown in FIGURE 4, or by any other suitable supporting structure.

FIGURE 4 discloses a plasma generator which incorporates the plasma containing structure of both FIGURES 1 and 3. The generator of FIGURE 4 operates in the same manner as does the generator 10 of FIGURE 1, but the expanding plasma is contained by a combination of the mechanical shield 24 and the outer encircling conductors 13, 14 and 15.

The controlled plasma generator of the present invention is capable of producing a much greater pinch or squeeze effect than are the toroidal or linear tubes presently in use. This is made possible by the fact that the magnetic fields created about the plasma and the current carrying outer conductors act throughout their entire length, while in the conventional toroidal tube, the squeeze effect is obtained by utilizing a toroid coil with a straight arc or plasma passing through the center of the toroid. The combination of the greater squeeze effect obtained from the controlled plasma generator of the present invention added to the fact that a circular plasma permits the entire length of the arc to occupy a smaller volume or space, will permit much higher plasma temperatures to be obtained. The plasma of circular or oval configuration provides advantages of control not possessed by the conventional shaped plasma, and the higher temperatures obtained make the generator valuable for use in research relative to the production of controlled thermo nuclear energy. The circular configuration of the plasma produced by the present invention also provides advantages over the conventional straight plasma when the generator is utilized as a means for the decomposition of chemical compounds, as the raw chemical ores may be easily fed in the shape of a mound through the center of the circular plasma.

It will therefore be obvious to those skilled in the art that the present invention provides a novel controlled generator and method for creating and maintaining a circular or oval shaped plasma which lends itself to a wide variety of applications. The arrangement and types of components utilized within this invention may be subject to numerous modifications well within the purview

I claim:

1. A plasma generator for producing a circular plasma within an ionizable material comprising a pair of spaced electrodes, a source of electrical power connected to said electrodes, and a movable striking electrode for momentarily bridging said spaced electrodes and said striking electrode, said spaced electrodes inducing an oppositely directed current flow in each of said arcs to cause radial expansion thereof.

2. A controlled plasma generator for producing a circular plasma within an ionizable material comprising a pair of spaced electrodes, encircling outer conductor means about said electrodes, a source of electrical power connected to said spaced electrodes and said encircling outer conductor means to induce electrical currents which flow through said encircling conductor means in a direction opposite to the current flow across said spaced electrodes, and a movable striking electrode for momentarily bridging said spaced electrodes to create an arc of conducting plasma between each of said space electrodes and said striking electrode, said spaced electrodes inducing an oppositely directed current flow in each of said arcs whereby a resultant self-induced magnetic field is created which causes radial expansion of said arcs in opposition to a self-induced magnetic field which is created about said encircling conductors upon the energization thereof.

3. The controlled plasma generator of claim 2 in which said encircling outer conductor means comprises internally cooled conductors of tubular construction.

4. The controlled plasma generator of claim 2 in which said inner spaced electrodes and arcs of conducting plasma are electrically connected in series relationship with said outer encircling conductor means and said power source to provide current flow through said conducting plasma which is opposite in direction to the current flow through said encircling outer conductor means.

5. The controlled plasma generator of claim 4 in which said encircling outer conductor means includes three individual circular conductors connected in parallel across said power source.

6. A controlled plasma generator for producing a circular plasma within an ionizable material comprising a pair of spaced electrodes, a source of electrical power connected to said spaced electrodes, a movable striking electrode for momentarily bridging said spaced electrodes to create an arc of conducting plasma between each of spaced electrodes and said striking electrode, said spaced electrodes inducing an oppositely directed current flow in each of said arcs to cause radial expansion thereof, and circular shielding means about said spaced electrodes to contain said arcs within a predetermined area.

7. A controlled plasma generator for producing a circular plasma within an ionizable material comprising a pair of spaced electrodes, encircling outer conductor means about said spaced electrodes, a source of electrical power connected to said spaced electrodes and said encircling outer conductor means to induce electrical currents which flow through said encircling conductor means in a direction opposite to the current flow across said spaced electrodes, a movable striking electrode for momentarily bridging said spaced electrodes to create an arc of conducting plasma between each of said spaced electrodes and said striking electrode, and a shielding means about said spaced electrodes to substantially contain said arcs of conducting plasma within a predetermined area, said spaced electrodes inducing an oppositely directed current flow in each of said arcs whereby a resultant self-induced magnetic field is created which causes radial expansion of said arcs in opposition to a self-induced magnetic field which is created about said encircling conductor upon the energization thereof.

No references cited.